(12) United States Patent
Klein (10) Patent No.: US 9,015,390 B2
(45) Date of Patent: Apr. 21, 2015

(54) ACTIVE MEMORY DATA COMPRESSION SYSTEM AND METHOD

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 1264 days.

(21) Appl. No.: 10/424,206

(22) Filed: Apr. 25, 2003

(65) Prior Publication Data

US 2004/0215852 A1    Oct. 28, 2004

(51) Int. Cl.
| | | |
|---|---|---|
| *G06F 13/14* | (2006.01) | |
| *G06F 9/30* | (2006.01) | |
| *G06F 12/00* | (2006.01) | |
| *G06F 9/38* | (2006.01) | |
| *G06F 15/78* | (2006.01) | |

(52) U.S. Cl.
CPC .......... *G06F 9/3879* (2013.01); *G06F 9/30036* (2013.01); *G06F 9/3887* (2013.01); *G06F 15/785* (2013.01)

(58) Field of Classification Search
USPC .................. 710/5, 68; 712/16, 20–22, 11, 14
See application file for complete search history.

(56) References Cited

U.S. PATENT DOCUMENTS

| | | | | |
|---|---|---|---|---|
| 4,468,688 | A | | 8/1984 | Gabriel et al. .................. 358/22 |
| 5,404,553 | A | | 4/1995 | Komori et al. ................. 395/800 |
| 5,528,549 | A | | 6/1996 | Doddington et al. .... 365/230.03 |
| 5,528,550 | A | | 6/1996 | Pawate et al. ............ 365/230.03 |
| 5,915,077 | A | | 6/1999 | Kulkarni et al. .............. 395/109 |
| 6,002,411 | A | * | 12/1999 | Dye ............................... 345/542 |
| 6,058,056 | A | | 5/2000 | Beffa et al. .................... 365/201 |
| 6,108,460 | A | * | 8/2000 | Rich .............................. 382/304 |
| 6,163,863 | A | | 12/2000 | Schicht ......................... 714/718 |
| 6,191,791 | B1 | | 2/2001 | Dyer et al. ..................... 345/429 |
| 6,212,628 | B1 | * | 4/2001 | Abercrombie et al. ........ 712/226 |
| 6,237,786 | B1 | | 5/2001 | Ginter et al. .................. 213/153 |
| 6,326,966 | B1 | | 12/2001 | Dyer et al. ..................... 345/420 |
| 6,337,684 | B1 | | 1/2002 | Dyer et al. ..................... 345/419 |
| 6,704,022 | B1 | * | 3/2004 | Aleksic ......................... 345/555 |
| 6,754,802 | B1 | * | 6/2004 | Kirsch ........................... 712/14 |
| 2002/0070943 | A1 | | 6/2002 | Hall .............................. 345/572 |
| 2002/0199046 | A1 | | 12/2002 | Ruehle ......................... 710/100 |
| 2003/0012062 | A1 | * | 1/2003 | Ironi et al. .................... 365/200 |
| 2004/0193784 | A1 | | 9/2004 | Kirsch .......................... 711/104 |
| 2004/0193839 | A1 | | 9/2004 | Kirsch ............................. 712/4 |
| 2004/0193840 | A1 | | 9/2004 | Kirsch ........................... 712/10 |
| 2004/0193842 | A1 | | 9/2004 | Kirsch ........................... 712/13 |
| 2004/0221135 | A1 | | 11/2004 | Kirsch ........................... 712/10 |
| 2006/0233261 | A1 | | 10/2006 | Yavits et al. | |
| 2008/0295167 | A1 | * | 11/2008 | Holtzman et al. .............. 726/20 |
| 2009/0125698 | A1 | * | 5/2009 | Dye ............................... 711/171 |

* cited by examiner

*Primary Examiner* — Ilwoo Park
(74) *Attorney, Agent, or Firm* — Dorsey & Whitney LLP (57) ABSTRACT

An integrated circuit active memory device receives task commands from a component in a host computer system that may include the active memory device. The host system includes a memory controller coupling the active memory device to a host CPU and a mass storage device. The active memory device includes a command engine issuing instructions responsive to the task commands to either an array control unit or a DRAM control unit. The instructions provided to the DRAM control unit cause data to be written to or read from a DRAM and coupled to or from either the processing elements or a host/memory interface. The processing elements execute instructions provided by the array control unit to decompress data written to the DRAM through the host/memory interface and compress data read from the DRAM through the host/memory interface.

25 Claims, 5 Drawing Sheets

ACTIVE MEMORY DATA COMPRESSION SYSTEM AND METHOD

TECHNICAL FIELD

This invention relates memory devices, and, more particularly, to techniques for efficiently transferring data to and from active memory devices.

BACKGROUND OF THE INVENTION

A common computer processing task involves sequentially processing large numbers of data items, such as data corresponding to each of a large number of pixels in an array. Processing data in this manner normally requires fetching each item of data from a memory device, performing a mathematical or logical calculation on that data, and then returning the processed data to the memory device. Performing such processing tasks at high speed is greatly facilitated by a high data bandwidth between the processor and the memory devices. The data bandwidth between a processor and a memory device is proportional to the width of a data path between the processor and the memory device and the frequency at which the data are clocked between the processor and the memory device. Therefore, increasing either of these parameters will increase the data bandwidth between the processor and memory device, and hence the rate at which data can be processed.

An active memory device is a memory device having its own processing resource. It is relatively easy to provide an active memory device with a wide data path, thereby achieving a high memory bandwidth. Conventional active memory devices have been provided for mainframe computers in the form of discrete memory devices having dedicated processing resources. However, it is now possible to fabricate a memory device, particularly a dynamic random access memory ("DRAM") device, and one or more processors on a single integrated circuit chip. Single chip active memories have several advantageous properties. First, the data path between the DRAM device and the processor can be made very wide to provide a high data bandwidth between the DRAM device and the processor. In contrast, the data path between a discrete DRAM device and a processor is normally limited by constraints on the size of external data buses. Further, because the DRAM device and the processor are on the same chip, the speed at which data can be clocked between the DRAM device and the processor can be relatively high, which also maximizes data bandwidth. The cost of an active memory fabricated on a single chip can is also less than the cost of a discrete memory device coupled to an external processor.

An active memory device can be designed to operate at a very high speed by parallel processing data using a large number of processing elements ("PEs") each of which processes a respective group of the data bits. One type of parallel processor is known as a single instruction, multiple data ("SIMD") processor. In a SIMD processor, each of a large number of PEs simultaneously receive the same instructions, but they each process separate data. The instructions are generally provided to the PE's by a suitable device, such as a microprocessor. The advantages of SIMD processing are simple control, efficient use of available data bandwidth, and minimal logic hardware overhead. Another parallel processing architecture is multiple instruction, multiple data ("MIMD") in which a large number of processing elements process separate data using separate instructions.

A high performance active memory device can be implemented by fabricating a large number of SIMD PEs or MIMD PEs and a DRAM on a single chip, and coupling each of the PEs to respective groups of columns of the DRAM. The instructions are provided to the PEs from an external device, such as a host microprocessor. The number of PE's included on the chip can be very large, thereby resulting in a massively parallel processor capable of processing vast amounts of data.

In operation, data to be operated on by the PEs are first written to the DRAM, generally from an external source such as a disk, network or input/output ("I/O") device in a host computer system. In response to common instructions passed to all of the PEs, the PE's fetch respective groups of data to be operated on by the PEs, perform the operations called for by the instructions, and then pass data corresponding to the results of the operations back to the DRAM. After they have been written to the DRAM, the results data can be either coupled back to the external source or processed further in a subsequent operation. By operating on the data using active memory devices, particularly active memory devices using SIMD PEs and MIMD PEs, the data can be processed very efficiently. If the same data were operated on by a microprocessor or other central processing unit ("CPU"), it would be necessary to couple substantially smaller blocks of data from the memory device to the CPU for processing, and then write substantially smaller blocks of results data back to the memory device. The wider data bus and faster data transfer speeds made possible by using an active memory instead of a conventional memory result in a significantly higher data bandwidth.

Although an active memory device allows much more efficient processing of data stored in memory, the processing speed of a computer system using active memory devices is somewhat limited by the time required to transfer operand data to the active memory for processing and the time required to transfer results data from the active memory after the operand data has been processed. During such data transfer operations, active memory devices are essentially no more efficient than passive memory devices that also require data stored in the memory device to be transferred to and from an external device, such as a CPU.

There is therefore a need for a system and method for allowing data to be more efficiently transferred between active memory devices and an external system.

SUMMARY OF THE INVENTION

An integrated circuit active memory device includes a memory device and an array of processing elements, such as SIMD or MIME processing elements, coupled to the memory device. Compressed data transferred through a host/memory interface port are first written to the memory device. The processing elements then decompresses the data stored in the memory device and write the decompressed data to the memory device. The processing elements also read data from the memory device, compress the data read from the memory device, and then write the compressed data to the memory device. The compressed data are then transferred through the host/memory interface. Instructions are preferably provided to the processing elements by an array control unit, and memory commands are preferably issued to the memory device through a memory control unit. The array control unit and the memory control unit preferably execute instructions provided by a command engine responsive to task commands provided to the active memory device by a host computer system.

DETAILED DESCRIPTION OF THE INVENTION

Figure 1:
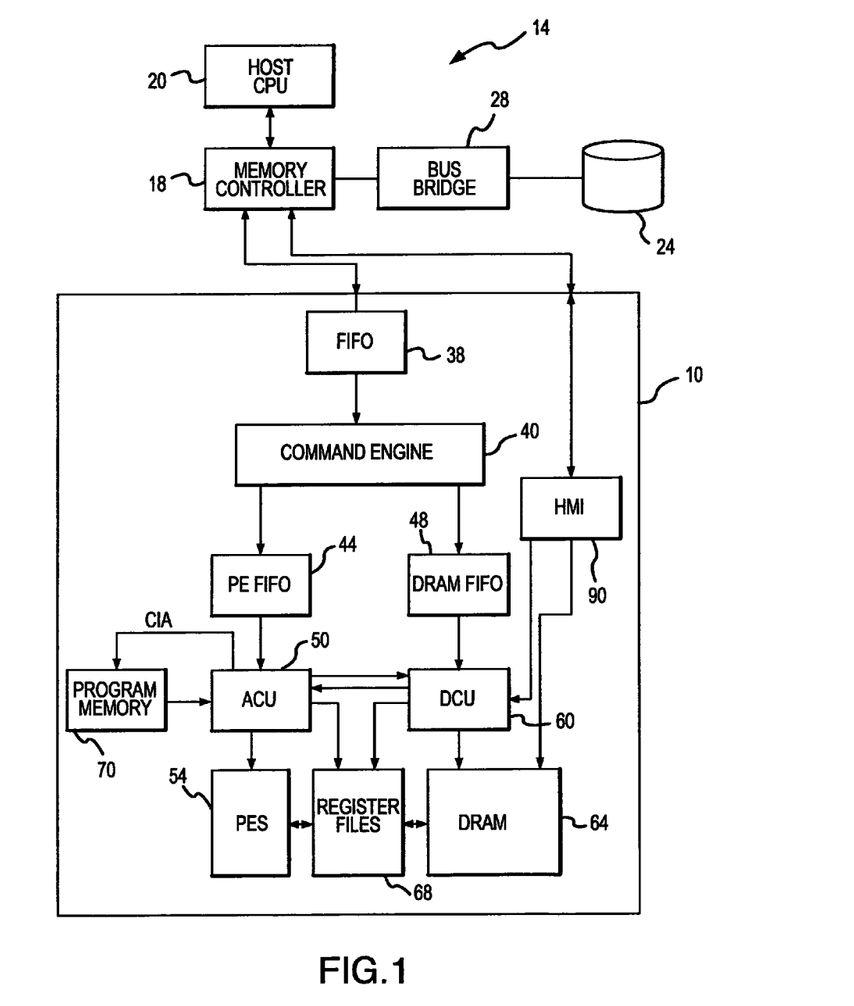
FIG. 1 is a block diagram of a computer system using an active memory device according to one embodiment of the invention.

FIG. 1 shows an active memory device 10 according to one embodiment of the invention. The memory device 10 is preferably a component in a host system 14, which may include a memory controller 18, a host CPU 20, a mass storage device 24, such as a disk drive, a bus bridge 28 coupled between the memory controller 18 and the mass storage device 24, and other components that have been omitted from the host system 14 shown in FIG. 1 for the purpose of brevity and clarity. For example, a network (not shown), such as a local area network ("LAN"), may be coupled to the bus bridge 28. Also, a high speed interface (not shown), such as an Infiniband or Hypertransport interface, could be coupled to the memory controller 18. Other variations to the host system 14 shown in FIG. 1 will be apparent to one skilled in the art.

The active memory device 10 includes a first in, first out ("FIFO") buffer 38 that receives high level task commands from the host system 14, which may also include a task address. The received task commands are buffered by the FIFO buffer 38 and passed to a command engine 40 at the proper time and in the order in which they are received. The command engine 40 generates respective sequences of instructions corresponding to the received task commands. These instructions are at a lower level than the task commands. The instructions are coupled from the command engine 40 to either a processing element ("PE") FIFO buffer 44 or a dynamic random access memory ("DRAM") FIFO buffer 48 depending upon whether the commands are PE commands or DRAM commands.

If the instructions are PE instructions, they are passed to the PE FIFO buffer 44 and then from the buffer 44 to a processing array control unit ("ACU") 50. The ACU 50 subsequently passes microinstructions to an array of PEs 54. The PEs 54 preferably operate as SIMD processors in which all of the PEs 54 receive and simultaneously execute the same instructions, but they may do so on different operands. However, the PEs 54 may alternatively operate at MIMD processors or some other type of processors.

If the instruction from the command engine 40 are DRAM instructions, they are passed to the DRAM FIFO buffer 48 and then to a DRAM Control Unit ("DCU") 60. The DCU 60 couples memory commands and addresses to a DRAM 64 to read data from and write data to the DRAM 64. In the embodiment shown in FIG. 1, there are 256 PE's 54 each of which is coupled to receive 8 bits of data from the DRAM 64 through register files 68. The register files 68 thus allow operand data to be coupled from the DRAM 64 to the PEs 54, and results data to be coupled from the PEs 54 to the DRAM 64. In the embodiment shown in FIG. 1, the DRAM 64 stores 16 M bytes of data. However, it should be understood that the number of PEs 54 used in the active memory device 10 can be greater or lesser than 256, and the storage capacity of the DRAM 64 can be greater or lesser than 16 Mbytes.

Figure 2:
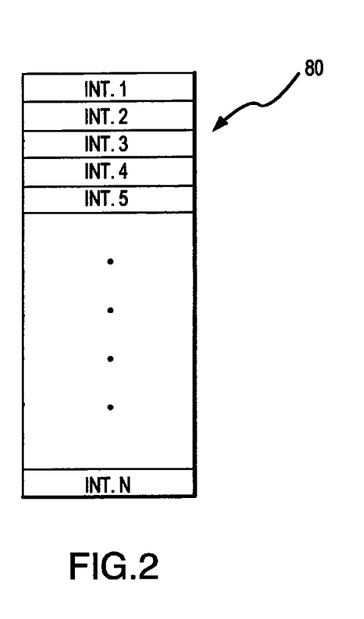
FIG. 2 is a memory map showing the organization of intrinsics stored in a program memory in the active memory device of FIG. 1.

The ACU 50 executes intrinsic routines each containing several microinstructions responsive to the command from the FIFO buffer 44. These microinstructions are stored in a program memory 70, which is preferably loaded at power-up or at some other time based on specific operations that the active memory device 10 is to perform. Control and address ("C/A") signals are coupled to the program memory 70 from the ACU 50. A memory map 80 of the program memory 70 according to one embodiment is shown in FIG. 2. The memory map 80 shows a large number of intrinsics 84-1, -2, -3, -4 . . . N, each of which is composed of one or more microinstructions, as previously explained. These microinstructions generally include both code that is executed by the ACU 50 and code that is executed by the PEs 54. The microinstructions in at least some of the intrinsics 84 cause the PEs 54 to perform respective operations on data received from the DRAM 54 through the register files 68. The microinstructions in other of the intrinsics 84 cause data to transferred from the PEs 54 to the register files 68 or from the register files 68 to the PEs 54. As explained in greater detail below, the microinstructions in other of the intrinsics 84 are involved in the transfer of data to and from the DRAM 54.

In operation, in response to each task command from the host system 14, the command engine 40 executes respective sequences of instructions stored in an internal program memory (not shown). The instructions generally include both code that is executed by the command engine 40 and PE instructions that are passed to the ACU 50. Each of the PE instructions that are passed to the ACU 50 is generally used to address the program memory 70 to select the first microinstruction in an intrinsic 84 corresponding to the PE instruction. Thereafter, the ACU 50 couples command and address signals to the program memory 70 to sequentially read from the program memory 70 each microinstruction in the intrinsic 84 being executed. As mentioned above, a portion of each microinstruction from the program memory 70 is executed by the PEs 54 to operate on data received from the register files 68.

With further reference to FIG. 1, the DRAM 54 may also be accessed directly by the host system 14 through a host/memory interface ("HMI") port 90. The HMI port 90 is adapted to receive a set of memory commands that are substantially similar to the commands of a conventional SDRAM except that it includes signals for performing a "handshaking" function with the host system 14. These commands include, for example, ACTIVE, PRECHARGE, READ, WRITE, etc. In the embodiment shown in FIG. 1, the HMI port 90 includes a 32-bit data bus and a 14-bit address bus, which is capable of addressing 16,384 pages of 256 words. The address mapping mode is configurable to allow data to be accessed as 8, 16 or 32 bit words. However, other memory configurations are, of course, possible.

In a typical processing task, the host system 14 passes a relatively large volume of data to the DRAM 64 through the HMI port 90, often from the mass storage device 24. The host system 14 then passes task commands to the active memory device 10, which cause subsets of operand data to be read from the DRAM 64 and operated on by the PEs 54. Results data generated from the operations performed by the PEs 54 are then written to the DRAM 64. After all of the subsets of data have been processed by the PE's 54, the relatively large volume of results data are read from the DRAM 64 and passed to the host system 14 through the HMI port 90. Also, of course, the DRAM 64 may simply be used as system memory for the host system 14 without the PEs 54 processing any of the data stored in the DRAM 64.

As mentioned above, the time required to transfer relatively large volumes of data from the host system 14 to the DRAM 64 and from the DRAM 64 to the host system 14 can markedly slow the operating speed of a system using active memory devices. If the data could be transferred trough the HMI port 90 at a more rapid rate, the operating efficiency of the active memory device 10 could be materially increased.

According to one embodiment of the invention, the host system 14 transfers compressed data through the HMI port 90 to the DRAM 64. The compressed data are then transferred to the PEs 54, which execute a decompression algorithm to decompress the data. The decompressed data are then stored in the DRAM 64 and operated on by the PEs 54, as previously explained. The results data are then stored in the DRAM 64. When the data stored in the DRAM 64 are to be transferred to the host system 14, the data are first transferred to the PEs 54, which execute a compression algorithm to compress the data. The compressed data are then stored in the DRAM 64 and subsequently transferred to the host system 14 through the HMI port 90. By transferring only compressed data through the HMI port 90, the data bandwidth to and from the DRAM 64 is markedly increased.

The PEs 54 preferably compress and decompress the data by executing microinstructions stored in the program memory 70. As previously mentioned, some of the intrinsics 84 (FIG. 2) stored in the program memory 70, such as 84-2, cause the PEs 54 to decompress data transferred from the host system 14 through the HMI port 90. Other of the intrinsics 84 stored in the program memory 70, such as 84-3, cause the PEs 54 to compress data before being transferred to the host system 14 through the HMI port 90. The intrinsics 84 can compress and decompress the data using any of a wide variety of conventional or hereinafter developed compression algorithms.

Figure 3:
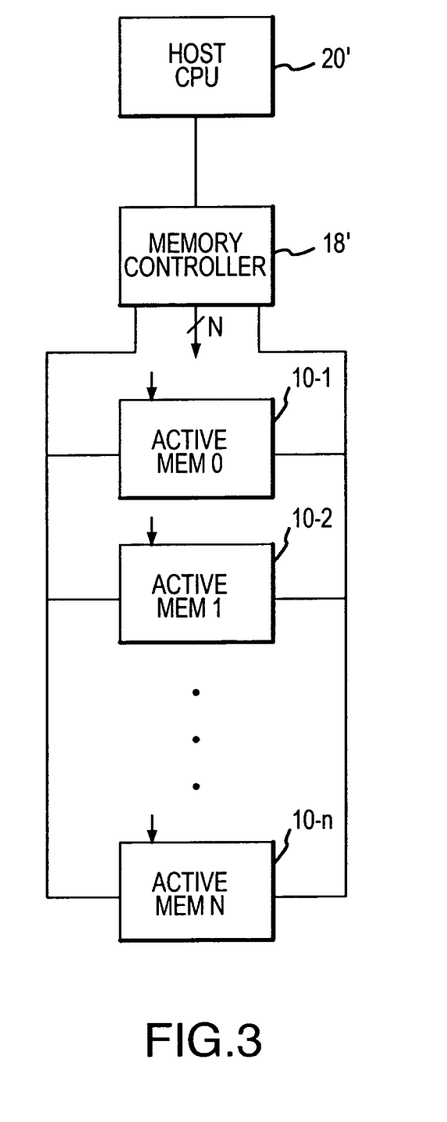
FIG. 3 is a block diagram of computer system using several active memory devices according to one embodiment of the invention.

A single active memory device 10 may be used in a computer system as shown in FIG. 1, or multiple active memory devices 10-1, 10-2 . . . 10-n may be used as shown in FIG. 3. In the system of FIG. 3, the active memory devices 10 are coupled to the memory controller 18', which is, in turn, coupled to the host CPU 20'. The memory controller 18' of FIG. 3 is substantially identical to the memory controller 18 of FIG. 1 except that it outputs an N-bit control signal to specify which of the active memory devices 10 is to communicate with the memory controller 18'. Other components of the computer system, some of which are shown in FIG. 1, have been omitted from FIG. 3 in interest of brevity and clarity. The use of several active memory devices 10 can substantially increase the memory bandwidth of a computer system in which they are included because the host system 14' can be passing data to or from one of the active memory devices 10 while another of the active memory devices 10 is decompressing data that has been transferred from the host system 14' or compressing data prior to being transferred to the host system 14'.

The operation of the computer system shown in FIG. 3 for a typical data transfer operation will now be explained with reference to the flowchart of FIG. 4, which illustrates the execution of a "page to disk" task command from the host system 14. As is well known in the art, a page to disk command is a command that transfers data stored in a block of memory, known as a "page," to a storage location in a disk drive. The operation is entered at 100, and the host CPU 20 formulates a "page to disk" task command at 104. At 106, the host CPU 20 computes the locations of the page to be transferred, which is designated by a DRAM address in the active memory devices 10. As explained below, the memory controller 18' in the host system 14' preferably accesses each of the active memory devices 10-1, 10-2 . . . 10-n in sequence. A memory device index "I" is set to the number "N" of active memory devices 10 in the system at 108. The host CPU 20, through the memory controller 18, then issues the task command to the highest order active memory device 10 at 110. The task command consists of a "page to disk" command and the address in the active memory devices 10 from where the data is to be transferred. As explained above, this address was calculated at step 106. After the task command has been issued by the memory controller 18, the memory device index I is decremented at 114 and a determination is made at 116 whether or not the previously issued task command was issued to the first active memory device 10-1. If the task command has not yet been issued to the first active memory device 10-1, the operation returns to 110 where the "page to disk" command is issued to the next active memory device 10. When the task command has been issued to the first active memory device 10-1, the operation progresses to 120 where a delay is initiated that allows the active memory devices 10 sufficient time to complete the task corresponding to the task commands. Thus, the task commands may be issued to the active memory devices 10 at a rate that is faster than the active memory devices 10 can complete the task. During the time that the active memory devices 10 are processing the "page to disk" task commands at step 120, the DRAM 64 in each of the active memory devices 10 transfer the block of data in the designated page to the respective array of PEs 54 through the register files 68. The PEs 54 then compress the data by executing the microcode in an intrinsic 84 stored in the program memory 70 in each of the active memory devices 10. The PEs 54 then transfer the compressed data through the register files 68 back to the DRAM 64.

After sufficient time has lapsed for the active memory devices 10 to complete the task of compressing the read data stored in the designated page and making the compressed data available to the HMI port 90, direct memory access ("DMA") operations to the mass storage device 24' are initiated at 124. In this regard, the DMA operations may be initiated at a rate that is faster than the mass storage device 24' can complete the operations. The DMA operations are simply stored as a list of DMA operations that are sequentially completed, which is detected at 126. Each DMA operation causes the compressed data stored in the DRAM 64 to be sequentially coupled to the mass storage device 24' through the HMI port 90 and memory controller 18'. The "page to disk" task is then completed at 128.

Figure 4:
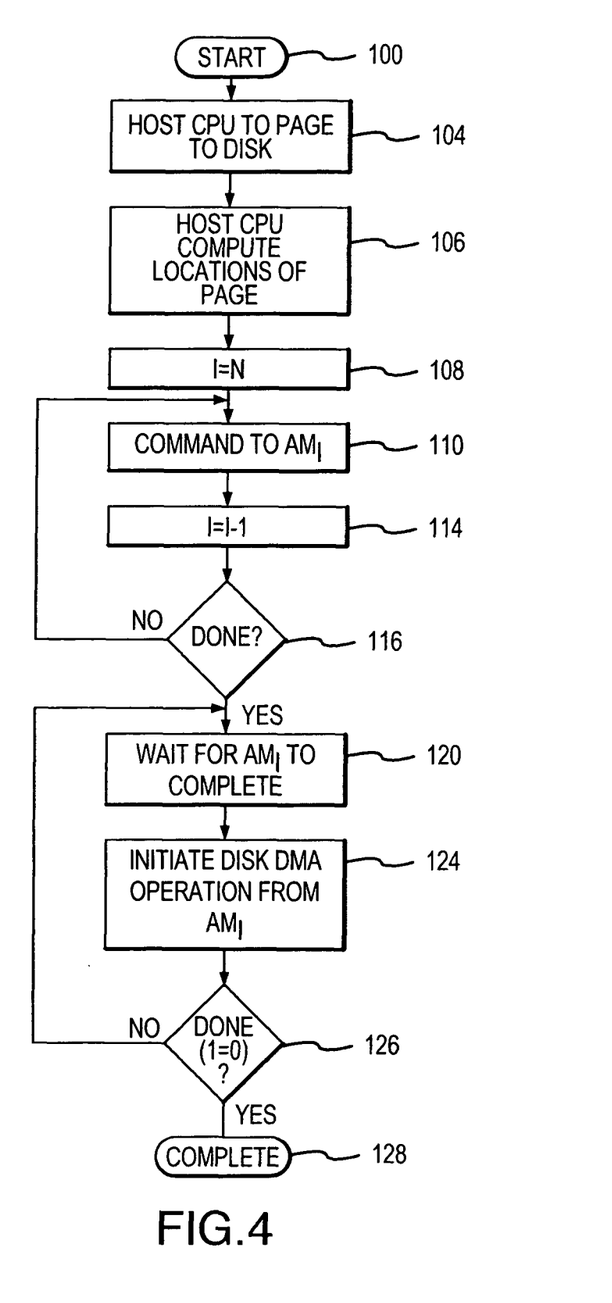
FIG. 4 is a flow chart showing one embodiment of a procedure for transferring data from the active memory device to a mass storage device in the computer system of FIG. 3.
Figure 5:
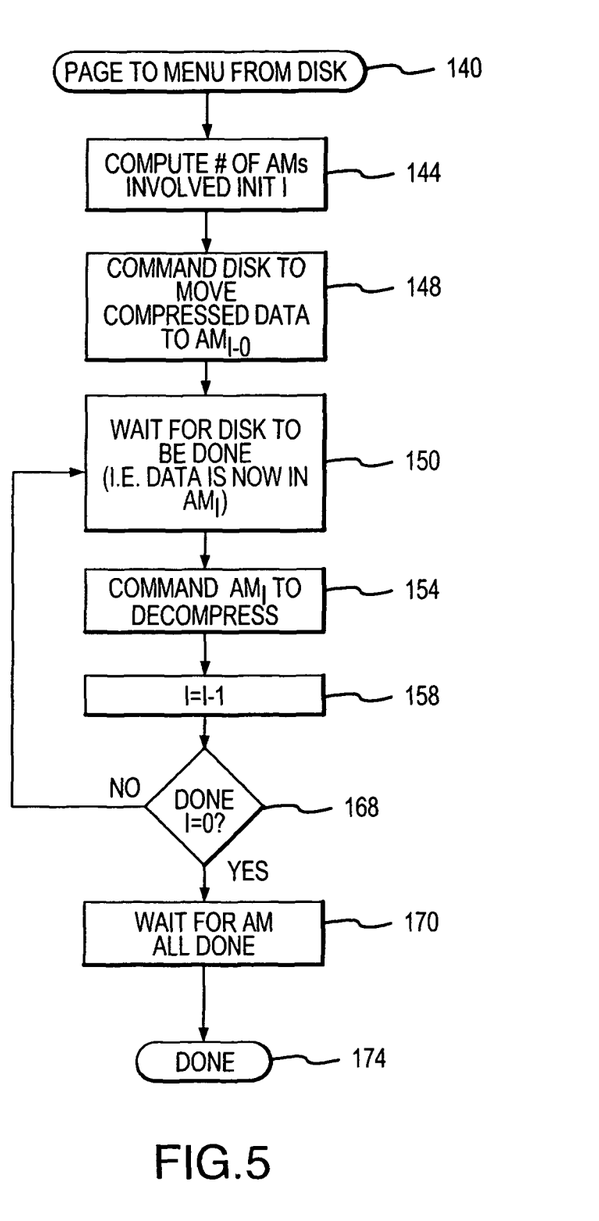
FIG. 5 is a flow chart showing one embodiment of a procedure for transferring data from a mass storage device to active memory devices in the computer system of FIG. 3.

A "memory page from disk" algorithm that is the reverse of the operation shown in FIG. 4 is shown in FIG. 5. The operation is initiated at 140, and a determination is made at 144 of the number of active memory devices 10 to which the data in the mass storage device 24 will be transferred. The memory device index I is then set to that number at 144. The host CPU 20' then issues a command at 148 that causes the designated compressed data stored in the mass storage device 24' to be transferred through the memory controller 18' and the HMI port 90 to the DRAM 64 in the highest order active memory device 10 to which data will be transferred. The operation waits at 150 until the data have been transferred from the mass storage device 24'. The host CPU 20' then issues a decompress task command to the active memory device 10 at step 154. In response to the decompress task command, the DRAM 64 in the active memory device 10 being addressed transfers the compressed data through the register files 68 to the array of PEs 54. The PEs 54 then decompress the data by executing one of the intrinsics 84 stored in the program memory 70, and then transfer the decompressed data through the register files 68 to the DRAM 64.

After the data from the mass storage device 24 have been downloaded to the DRAM 64 and decompressed, the memory device index I is decremented at 158 in a determination is made at 160 whether I=1 corresponding to the data being transferred from the mass storage device 24 to the first active memory device 10-1. If not, the operation returns to 150 to repeat the process described above. If all of the data have been transferred from the mass storage device 24, the operation branches to 170 where it waits for all of the downloaded data to be decompressed by the PEs 54 and stored in the respective DRAM 64. The operation and then takes its through 174.

Although only the "page to disk" and the "memory page from disk" operations have been described herein, it will be understood that other operations can also occur, and corresponding intrinsics 84 are stored in the program memory 70 to assist in carrying out these operations. For example, intrinsics 84 could be provided that cause the PEs 54 to compress and/or decompress all of the data stored in the DRAM 64, or to compressed and/or decompress data stored in the DRAM 64 only within certain ranges of addresses. Other operations in which the PEs 54 compress or decompress data will be apparent to one skilled in the art and, of course, can also be carried out in the active memory device 10.

From the foregoing it will be appreciated that, although specific embodiments of the invention have been described herein for purposes of illustration, various modifications may be made without deviating from the spirit and scope of the invention. For example, rather than transfer the compressed data from the HMI port 90 to the DRAM 64 prior to being decompressed by the PEs 54, it may be possible to transfer the compressed data directly from the HMI port 90 to the register files 68 or some other component (not shown) before being decompressed by the PEs 54. Similarly, rather than storing data compressed by the PEs 54 in the DRAM 64 before being transferring the compressed data through the HMI interface 90, it may be possible to store the data compressed by the PEs 54 in the register files 68 or some other location prior to being transferred through the HMI port 90. As another example, instead of or in addition to transferring the data from the active memory device 10 to the mass storage device 24, it may be transferred to other components, such as the host CPU 20, a graphics processor (not shown), etc., through a DMA operation or some other operation. Furthermore, as mentioned above, the PEs 54 need not SIMD PEs, but instead can be other types of processing devices such as multiple instruction multiple data ("MIMD") processing elements. Accordingly, the invention is not limited except as by the appended claims.

The invention claimed is:

1. An integrated circuit active memory device comprising:
a memory device having a data bus containing a plurality of data bus bits;
an array of processing elements each of which is coupled to a respective group of the data bus bits, each of the processing elements having an instruction input coupled to receive processing element instructions for controlling the operation of the processing elements;
register files coupled to the array of processing elements and the memory device, the register files transferring data between the processing elements and the memory device;
a host interface port coupled to the memory device and operable to receive direct access memory commands to provide direct access to the memory device to transfer compressed data to and from the memory device;
a task buffer coupled to a command engine and a memory controller, the task buffer operable to receive high level task commands from the memory controller and provide the high level commands to the command engine in an order received, wherein the high level task commands include a task address;
the command engine coupled to receive task commands from the task buffer and operable to generate corresponding sequences of processing element instructions and memory instructions responsive to respective task commands to control the operation of the memory device and the processing elements to generate corresponding sequences of instructions to read data from and write data to the memory device, at least some of the instructions generated by the command engine responsive to the task commands causing the processing elements to decompress compressed data transferred to the active memory device through the host interface port and store the decompressed data in the memory device or to compress decompressed data transferred from the memory device that is to be transferred from the active memory device through the host interface port;
a processing element instructions buffer coupled to the command engine and an array control unit, the processing element instructions buffer operable to receive sequences of processing element instructions from the command engine and provide the sequences of processing element instructions to the array control unit in an order received;
the array control unit coupled to the processing element instructions buffer and the processing elements, the array control unit being operable to receive the sequences of processing element instructions from the processing element instructions buffer and to generate array control unit microinstructions responsive to the sequences of processing element instructions received from the processing element instructions buffer, at least some of the microinstructions causing the processing elements to either decompress data transferred to the active memory device through the host interface port and then store the decompressed data in the memory device or to compress decompressed data transferred from the memory device that is to be transferred through the host interface port;
a memory instructions buffer coupled to the command engine and a memory device control unit, the memory instructions buffer operable to receive sequences of memory instructions from the command engine and provide the sequences of memory instructions to the memory device in an order received; and
the memory device control unit coupled to the memory instructions buffer and the memory device, the memory device control unit operable to receive the sequences of memory instructions from the memory instructions buffer and to generate memory commands responsive to the sequences of memory instructions received from the memory instructions buffer.

2. The active memory device of claim 1 wherein the memory device comprises a dynamic random access memory device.

3. The active memory device of claim 1 wherein a host interface port is operable to transfer data to and from the memory device before the transferred data is decompressed and compressed, respectively, by the processing elements.

4. The active memory device of claim 1 further comprising a program memory coupled to the array control unit and configured to store a plurality of intrinsics each of which includes a plurality of microinstructions that are executed by the processing elements, the program memory being addressed by the array control unit, at least one of the intrinsics causing the processing elements to decompress data transferred to the active memory device through the host interface port and at least another of the intrinsics causing the processing elements to compress data transferred from the memory device.

5. The active memory device of claim 1 wherein the host interface port is coupled to the memory control unit to supply control signals the memory control unit, the memory control unit applying control signals to the memory device responsive to control signals received from the host interface port.

6. The active memory device of claim 1 wherein the processing elements comprise single instruction, multiple data processing elements that receive common instructions from the control unit.

7. The active memory device of claim 1 wherein the processing elements comprise multiple instruction, multiple data processing elements at least some of which receive instructions from the control unit that are different from instructions received from the control unit by other of the processing elements.

8. The active memory device of claim 1, further comprising a program memory storing a plurality of intrinsics each of which includes a plurality of microinstructions that are executed by the processing elements, the program memory being addressed by the array control unit, at least one of the intrinsics causing the processing elements to decompress data transferred to the active memory device through the host interface port and at least another of the intrinsics causing the processing elements to compress data transferred from the memory device.

9. A computer system, comprising:
a host processor;
a peripheral device coupled to the host processor;
a memory controller coupled to the host processor and the peripheral device; and
an integrated circuit active memory device, comprising:
a memory device having a data bus containing a plurality of data bus bits;
an array of processing elements each of which is coupled to a respective group of the data bus bits, each of the processing elements having an instruction input coupled to receive processing element instructions for controlling the operation of the processing elements;
register files coupled to the array of processing elements and the memory device, the register files transferring data between the processing elements and the memory device;
a host/memory interface coupled to the memory controller and coupled to the memory device, the host/memory interface being operable to receive direct access memory commands to provide direct access to the memory device to transfer compressed data to or from the peripheral device and the active memory device;
a task buffer coupled to the memory controller and a command engine, the task buffer operable to receive high level task commands from the memory controller and provide the high level commands to the command engine in an order received, wherein the high level task commands include a task address;
a command engine coupled to the task buffer, the command engine being operable to receive task commands from the task buffer and operable to generate corresponding sequences of processing element instructions and memory instructions responsive to respective task commands to control the operation of the memory device and the processing elements to generate corresponding sequences of instructions responsive to memory commands to read data from and write data to the memory device, at least some of the instructions generated by the command engine responsive to the task commands causing the processing elements to decompress compressed data transferred to the active memory device through the host interface port and store the decompressed data in the memory device or to compress decompressed data read from the memory device, and to transfer the compressed data from the active memory device through the host interface port;
a processing element instructions buffer coupled to the command engine and an array control unit, the processing element instructions buffer operable to receive sequences of processing element instructions from the command engine and provide the sequences of processing element instructions to the array control unit in an order received;
the array control unit coupled to the processing element instructions buffer and the processing elements, the array control unit being operable to receive sequences of processing element instructions from the processing element instructions buffer and to generate array control unit microinstructions responsive to the sequences of processing element instructions received from the processing element instructions buffer, at least some of the microinstructions causing the processing elements to either decompress data transferred from the peripheral literal device to the active memory device through the host interface/memory interface and then store the decompressed data in the memory device or to compress previously decompressed data transferred from the memory device that is to be transferred to the peripheral device through the host/memory interface;
a memory instructions buffer coupled to the command engine and a memory device control unit, the memory instructions buffer operable to receive sequences of memory instructions from the command engine and provide the sequences of memory instructions to the memory device in an order received; and
the memory device control unit coupled to the memory instructions buffer and the memory device, the memory device control unit operable to receive sequences of memory instructions from the memory instructions buffer and to generate memory commands responsive to the sequences of memory instructions received from memory instructions buffer.

10. The computer system of claim 9 wherein the memory device comprises a dynamic random access memory device.

11. The computer system of claim 9 wherein the peripheral device comprises a mass storage device.

12. The computer system of claim 11 wherein the mass storage device comprises a disk drive unit.

13. The computer system of claim 9 wherein a host/memory interface is operable to transfer data to and from the memory device before the transferred data is decompressed and compressed, respectively, by the processing elements.

14. The computer system of claim 9 further comprising a program memory coupled to the array control unit and configured to store a plurality of intrinsics each of which includes a plurality of microinstructions that are executed by the processing elements, the program memory being addressed by the array control unit, at least one of the intrinsics causing the processing elements to decompress data transferred to the active memory device through the host/memory interface and at least another of the intrinsics causing the processing elements to compress data transferred from the memory device.

15. The computer system of claim 9 wherein the host/memory interface is coupled to the memory control unit to supply control signals the memory control unit, the memory control unit applying control signals to the memory device responsive to control signals received from the host/memory interface.

16. The computer system of claim 9 wherein the processing elements comprise single instruction, multiple data processing elements that receive common instructions from the control unit.

17. The computer system of claim 9 wherein the processing elements comprise multiple instruction, multiple data processing elements at least some of which receive instructions from the control unit that are different from instructions received from the control unit by other of the processing elements.

18. The computer system of claim 12 a program memory storing a plurality of intrinsics each of which includes a plurality of microinstructions that are executed by the processing elements, the program memory being addressed by the array control unit, at least one of the intrinsics causing the processing elements to decompress data transferred to the active memory device through the host/memory interface and at least another of the intrinsics causing the processing elements to compress data transferred from the memory device.

19. The computer system of claim 9, further comprising a plurality of active memory devices coupled to the memory controller, each of the plurality of active memory devices comprising:
 a memory device having a data bus containing a plurality of data bus bits;
 an array of processing elements each of which is coupled to a respective group of the data bus bits, each of the processing elements having an instruction input coupled to receive processing element instructions for controlling the operation of the processing elements;
 a host/memory interface coupled to the memory controller, the host/memory interface being operable to transfer data to or from the peripheral device and the active memory device; and
 a control unit coupled to the memory controller, the control unit being operable to receive task commands from the memory controller and to generate corresponding sequences of instructions responsive to each of the task commands to control the operation of the memory device and the processing elements, at least some of the instructions generated by the control unit causing the processing elements to either decompress data transferred to the active memory device through the host interface port and then store the decompressed data in the memory device or to compress data transferred from the memory device that is to be transferred from the active memory device through the host interface port; and wherein the memory controller is operable to sequentially transfer data to and from each of the plurality of active memory devices through the respective memory/host interface of the memory devices.

20. A computer system, comprising:
a host processor;
a peripheral device coupled to the host processor;
a memory controller coupled to the host processor and the peripheral device; and
an integrated circuit active memory device, comprising:
 a task command interface coupled to the memory controller and configured to receive task commands, wherein the task commands include a task address, and wherein the task command interface is a first-in, first-out buffer and provides the task commands in an order received;
 a host/memory interface coupled to the memory controller, the host/memory interface being operable to transfer data to or from the peripheral device and the active memory device;
 a processor operable to decompress compressed data that has been transferred to the active memory device through the host/memory interface and to compress the uncompressed data to be transferred through the host/memory interface from the active memory device;
 a memory device coupled to the processor, the memory device being operable to store uncompressed data and compressed data;
 register files coupled to the processor and the memory device, the register files configured to provide compressed data from the memory device to the processor to be decompressed and further configured to provide uncompressed data from the memory device to the processor to be compressed;
 a task command engine coupled to the task command interface and operable to generate processing instructions for the processor and memory instructions for the memory device responsive to respective task commands including the task address;
 a processing instructions buffer coupled to the task command engine and an array control unit, the processing instruction buffer operable to receive the processing instructions from the task command engine and provide the processing instructions to the array control unit in an order received;
 the array control unit coupled to the task command engine and processor, the array control unit operable to receive the processing instructions from the processing instructions buffer and to generate microinstructions responsive to the processing instructions received from the processing instructions buffer and provide the microinstructions to the processor, at least some of the microinstructions causing the processor to either decompress compressed data transferred from the memory device or to compress uncompressed data transferred from the memory device;
 a memory instructions buffer coupled to the task command engine and a memory device, the memory instructions buffer operable to receive the memory instructions from the task command engine and provide the memory instructions to the memory device in an order received; and
 the memory device control unit coupled to the memory instructions buffer and the memory device, the memory device control unit operable to receive memory instructions from the memory instructions buffer and to generate memory commands responsive to the memory instructions received from the memory instructions buffer.

21. The computer system of claim 20 wherein the processor comprises a plurality of processing elements each of which is coupled to a group of data bus bits of the memory device.

22. The computer system of claim 21 wherein the processing elements comprise single instruction, multiple data processing elements.

23. The computer system of claim 21 wherein the processing elements comprise multiple instruction, multiple data processing elements.

24. The computer system of claim 20 wherein the memory device comprises a dynamic random access memory device.

25. The computer system of claim 20 wherein a host interface port is operable to transfer data to and from the memory device before the transferred data is decompressed and compressed, respectively, by the processor.

* * * * *

UNITED STATES PATENT AND TRADEMARK OFFICE
CERTIFICATE OF CORRECTION

PATENT NO. : 9,015,390 B2  
APPLICATION NO. : 10/424206  
DATED : April 21, 2015  
INVENTOR(S) : Dean A. Klein

Page 1 of 1

It is certified that error appears in the above-identified patent and that said Letters Patent is hereby corrected as shown below:

IN THE CLAIMS

|  | Reads | Should Read |
|---|---|---|
| Column 10, Line 37 | "transferred from the peripheral literal device..." | --transferred from the peripheral device...-- |
| Column 10, Line 56 | "instructions received from memory instructions buffer." | --instructions received from the memory instructions buffer.-- |
| Column 11, Line 30 | "The computer system of claim 12 a program memory..." | --The computer system of claim 9 a program memory...-- |
| Column 12, Line 66-67 | "memory device control unit operable to receive memory instructions..." | --memory device control unit operable to receive the memory instructions...-- |

Signed and Sealed this  
Sixteenth Day of February, 2016

Michelle K. Lee  
*Director of the United States Patent and Trademark Office*